United States Patent [19]

Hellqvist

[11] 4,132,643
[45] Jan. 2, 1979

[54] SLUDGE AND SLIME SEPARATING AND SETTLING DEVICE

[76] Inventor: Åke O. V. Hellqvist, 130 40 Djurhamn, Sweden

[21] Appl. No.: 872,149

[22] Filed: Jan. 25, 1978

Related U.S. Application Data

[63] Continuation of Ser. No. 709,131, Jul. 27, 1976, abandoned.

[30] Foreign Application Priority Data

Jul. 29, 1975 [SE] Sweden .............................. 7508608

[51] Int. Cl.² ................................................ C02C 1/26
[52] U.S. Cl. .................................. 210/84; 210/532 S; 210/540
[58] Field of Search ................... 210/83, 84, 187, 207, 210/265, 513, 532 S, 532 R, 538, 540; 209/158, 160

[56] References Cited

U.S. PATENT DOCUMENTS

| | | | |
|---|---|---|---|
| 1,733,324 | 10/1929 | Wetherbee | 210/187 X |
| 1,801,262 | 4/1931 | Boosey | 210/187 |
| 2,678,873 | 5/1954 | Sablé | 210/538 X |
| 3,097,166 | 7/1963 | Monson | 210/532 S X |
| 3,221,881 | 12/1965 | Weiler et al. | 210/532 S X |
| 3,915,858 | 10/1975 | Condolios | 210/540 X |

Primary Examiner—William A. Cuchlinski, Jr.
Attorney, Agent, or Firm—Ladas, Parry, Von Gehr, Goldsmith & Deschamps

[57] ABSTRACT

This invention is related to a sludge and slime separating and settling device which typically comprises a container with a bottom and a lower, truncated conical part, an upper, truncated conical part with a spillover overflow extending around the upper edge, and an intermediate cylindrical part. The inlet is in the vertical direction in the middle of the container. The container is closed with a cover provided with an annular flow barrier wall extending from above the overflow level and dipping into the container.

14 Claims, 1 Drawing Figure

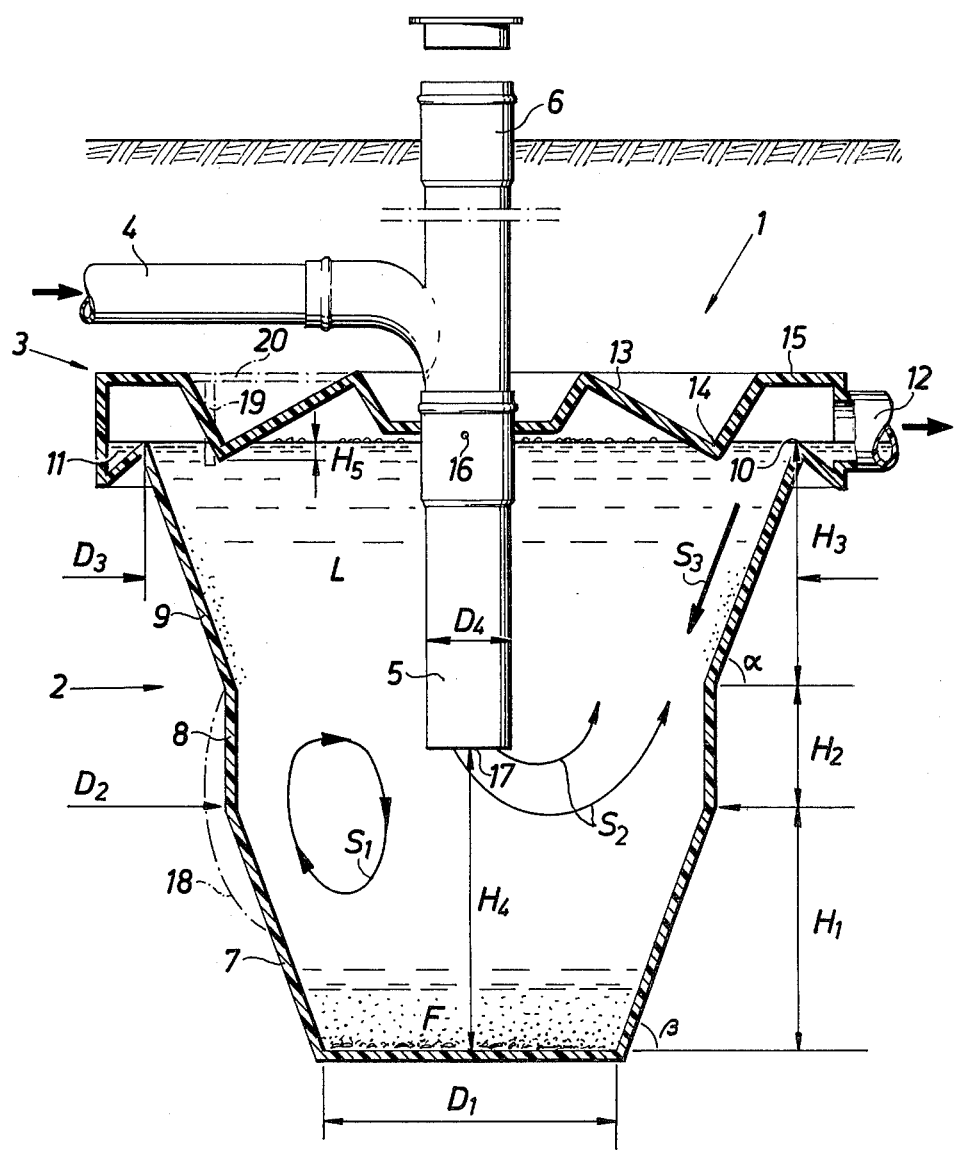

SLUDGE AND SLIME SEPARATING AND SETTLING DEVICE

This is a continuation of co-pending application Ser. No. 709,131 filed July 27, 1976 and now abandoned.

This invention is related to a sludge and slime separating or settling device for treating waste-water obtained as effluent from bathrooms from personal washing and kitchens from dishwashing, laundry cleaning and similar sources and especially all kinds of domestic waste water effluents including or besides WC sewage water containing human faecis, although the device also can be used in general for any kind of industrial, agricultural or domesic waste and effluent waters and liquids from which it is intended to separate slime and sludge. The invention is thus especially related to a slime or sludge sink or settling basin for treating domestic effluent waters which may or may not be essentially free from human faecis.

The device according to the invention comprises a container part of special shape, particularly a container with essentially rotary symetric shape which can essentially be defined by a vertical cross section. The device preferably also comprises a cover which closes the open upper end of the container, especially a cover of special shape and preferably a cover which essentially exhibits rotary symmetry i.e. has a circular horizontal cross section and can be defined by a vertical cross section. Thus the device preferably has a vertical central axis.

The shape of the container part preferably comprises two truncated conical parts with an intermediate, essentially cylindric part which joins the two truncated conical parts. The conical parts diverge in the upward direction. The lower conical part is joined to the bottom part of the container which preferably is a flat, horizontal or conical wall. The upper edge of the container preferably terminates in a spillway overflow for the liquid which is to be treated in the container. Said overflow preferably extends all around the periphery of the upper end of the container or preferably at least along the main portion and especially at least 80-90 % of the periphery of the upper edge. Said overflow preferably communicates with one or more outlets for the liquid which is treated in the container. Preferably the overflow edge is surrounded by a chute (flute) in which the liquid passing over the overflow is collected.

The cover of the device preferably has a special shape comprising a central, inner part arranged above the level of the upper periphery of the container, i.e. the overflow, an intermediate part which is arranged outside the central part, i.e. closer to the periphery of the container and extends below said periphery i.e. the overflow, and an outer part of the cover which is arranged outside said intermediate part and above the overflow edge of the container. The intermediate part may also be substituted with a skirt which dips into the liquid and forms a barrier wall at the surface or overflow level between an inner area of the surface and an annular outer surface area between the barrier and the overflow. The barrier wall extends from above the liquid surface to a suitable depth e.g. 5-20 cm below the surface and is preferably essentially cylindrical or conical and is arranged for preventing upfloating light sludge from passing the overflow. The lower end of the barrier or skirt may extend to a short distance from the slooping container wall e.g. 5-10 cm from said wall, provided that a sufficient flow-through area remains.

A typical embodiment of a device according to the invention is disclosed on the FIGURE.

The FIGURE discloses a sludge separating and settling device 1 comprising a container 2 and a cover 3. Through an inlet tube 4 which is connected to a vertical tube 5 in the center of the container untreated waste water is introduced into the device. The mouth 17 of said inlet tube 4 is preferably arranged in level with the intermediate, cylindrical part 8 of the container, i.e. essentially in the middle of or in the middle third of the container in the vertical direction. The device is provided with an essential vertical tube 6 arranged centrally in the container as an extension of the inlet tube 5 for removing sludge and slime which has been separated and settled to the bottom of the container.

The device disclosed on the FIGURE is of a rotation symmetrical i.e. circular shape besides the outlet tube 12, but the shape can of course also be modified e.g. to an essentially polygon cross section, such as a square horizontal cross section or pentagonal, hexagonal, etc. cross section. The shape may also be a suitable combination of such cross sections, e.g. an essentially square cross section with rounded corners. Rotational symmetry, i.e. a circular horisontal cross section is normally preferred since a device of said shape can usually be produced more easily with sufficient strength and for a minimum of materials cost.

The device is preferably prepared from a plastic material, such as polyethylene or polypropylene, but also from other material such as metals especially steel or aluminum, or inorganic materials such as concrete made from cement and aggregates. The concrete may also be enforced, e.g. with metal or with inorganic fibres.

A preferred material is polyethylene or polypropylene and a preferred method of production is "rotation casting" in which method a heated mold, especially metal mold with the shape of the desired device is rotated in the heated condition with a charge of plastic powder, such as polyethylene powder, enclosed in the mold container. The rotated mold is heated so that the heated powder is melted and fuses to a layer on the mold inner surface. Preferably the container and cover are molded in one piece.

An example of suitable size of a device of the general shape disclosed on the FIGURE which is rotation cast in polyhethylene is the following:

| | |
|---|---|
| Capacity | 40 l/min. |
| Wet volume, total | 540 l |
| Sludge volume | 200 l |
| Treatment volume | 340 l |
| Overflow length | 3.45 m |
| Total height of container and cover | 1.1 m |
| Total height of container $H_1 + H_2 + H_3$ | 1.0 m |
| Upper periphery diameter $D_3$ | 1.1 m |
| Upper part, height $H_3$ | 0.4 m |
| Diameter of intermediate cylindrical part $D_1$ | 0.8 m |
| Height of intermediate part $H_2$ | 0.2 m |
| Bottom diameter $D_1$ | 0.5 m |
| Height of lower part $H_1$ | 0.4 m |
| Floating sludge surface | 0.45 m$^2$ |
| Inlet diameter $D_4$ | 0.1 m |
| Outlet diameter | 0.1 m |
| Wall thickness | 4-10 mm |

A larger device which especially is suitable for treating domestic sewage waste water including lavatory or water-closet effluents may have essentially the same vertical extension but $D_1 = 0.8$ m, $D_2 = 1.0$ m and $D_3 = 1.25$ m. Preferably this embodiment is provided with a barrier skirt acting as the intermediate part of the cover and substituting said part.

The device according to the invention and especially the embodiment disclosed on the FIGURE is intended to be highly resistant against soil pressure and the special shape is simultaneously used for improving the effect as a sludge separating device or settling basin.

The lower, truncated conical part 7 of the container gives a high resistance against soil pressure and also concentrates the settling sludge against the bottom from which the sludge can easily be removed.

The essentially cylindrical intermediate part 8 of the container contributes to the stiffness of the container and also directs gas bubbles formed in the vertical direction so that said gas bubbles can be concentrated to the inner, central part of the cover, in which a gas pocket is formed, or within the barrier skirt.

The upper truncated conical part 9 of the container increases the flow cross area in the upper part which gives a very low flow rate or flow speed and a correspondingly improved separation and settling of fine particles and light materials so that these constituents of the treated water settle and fall down to the lower parts of the device, especially along the sloping conical inner surface of the upper part 9.

After passing the edge 10 of the container the liquid flows through a chute 11 arranged outside the overflow edge and flows to an outlet 12 which is connected to the cute 11.

The cover 3 on the FIGURE comprises the inner, central part 13 above the overflow edge 10 of the container, i.e. above the intented liquid level in the container, the intermediate part 14 which extends below the level of the overflow, and the outer part 15 which extends to and is joined to the chute 11 which extends around the periphery of the container.

This shape of the cover gives in conbination with the special shape of the container a concentration of light, floating materials, mainly gas and flat and digesting sludge to the inner part 13 of the cover from which the gas can escape through an opening 16. The floating fat and other floating constituents which accumulate under the inner part 13 of the cover can be removed through the sludge discharge tube 6.

As is obvious from the disclosed embodiment the shape of the container and also of the cover give essential functional advantages. Said shapes also give production technical advantages since the device can be produced by simple methods from low cost materials, e.g. by "rotation casting" of plastics, especially polyethylene or polypropylene, with a mechanical strength of the various parts of the device which make the device resistant against soil pressure and other loads which are exerted on a device which is arranged below the ground level.

The settling device or settling basin according to the invention also gives a very favourable flow pattern. As is disclosed on the FIGURE there may be formed in the lower part of the settling basin around the inlet tube 5 a zone with an essentially annular circulating flow pattern $S_1$ or preferably a simple reversing flow pattern $S_2$ indicated on the right side of the FIGURE. With a suitable size of the settling basin in relation to the maximum load there is maintained a "free zone" F in the lower part of the settling basin in which sedimenting sludge accumulates without being disturbed by the in-flowing water, besides optionally at a very high flow rate. The flow pattern in the annular zone $S_1$ can also be governed with special flow directing means which direct the flow of water introduced through the tube 5, and/or special flow-reverting or deflecting means or baffle means which are arranged to restrict the extension of the flow pattern zone $S_1$ in the upward direction and/or one or more concentric annular bands with the flat side essentially vertical or parallel with the conical wall arranged for directing the liquid in a slow flow over the largest possible part of the cross section of the upper part of the container in the zone L. Above the outlet opening 17 of the inlet tube there is desired and created on undisturbed or quiescent zone L through which water flows essentially in a laminar flow pattern to the overflow at the upper edge of the container. Furthermore, a weak downwardly directed flow pattern $S_3$ may form in the upper conical part 9 along the conical wall, said flow sweeping sedimenting material downwards.

On the FIGURE the vertical extension of the upper conical part is $H_3$, of the intermediate part $H_2$ and the lower conical part $H_1$. The slope angle of the upper conical part is denoted alpha, that of the lower conical part beta. The diamter of the upper edge of the conical part is denoted $D_3$, that of the cylindrical intermediate part $D_2$, that of the lower end of the lower conical part $D_1$, and that of the mouth 17 of the inlet tube $D_4$. The distance from said mouth 17 to the bottom of the container is denoted $H_4$. the ratios of said sizes are preferably maintained within the following ranges:

$H_3 : H_2 : H_1 = $ (1 to 2) : (0.5 to 2) : (1 to 2); especially
$H_3 : H_2 : H_1 = $ (1 to 2) : (0.5 to 1.5 or 1 to 2) : (1 to 2);
$D_1 + D_2 : D_3 : D_4 = $ (0.2 to 0.9; especially 0.3 to 0.7):
  1 : (1.5 to 1.1; especially 1.3 to 1.2) : (0.1 to 0.3);
$H_3 : H_1$ is typically (0.8 to 1.3) : 1
$H_4$ is typically $\frac{1}{4}$ to $\frac{2}{3}$ of $(H_1 + H_2 + H_3)$ or $H_1 H_4 (H_1 + H_2)$;
$H_4 : D_2$ is typically (0.3 to 1) : 1, e.g. 5 : 8; a typical value of $H_4$ is 0.5 m The ranges of the angles alpha and beta are
  typically 50° to (80° or 90°) and
  especially 60° to 70°.

The intermediate part may have an other shape than cylinderical, such as conical with a steeper slope than the upper or lower part or an upwardly converging conical surface. The intermediate part 8 and the lower part 7 can also have a somewhat modified shape provided that the desired flow pattern is maintained. Thus the parts 8 and 7 may be combined to a part with outwardly convex shape, such as barrel-shape as is indicated with a dotted line 18 on the FIGURE.

A device for treating waste waters with high contents of slime and sludge typically exhibits a higher value of the ratio of the diameter to the vertical extension. For the values of $H_1$, $H_2$ and $H_3$ given above with reference to the FIGURE the values D $D_1 = 0.8$ m, $D_2 = 1.0$ m and $D_3 = 1.25$ m can be selected. Furthermore, for said use of the device a skirt or barrier wall 19 is preferably used instead of the intermediate part 14 of the cover and the cover is preferably provided with a manhole.

I claim:

1. A domestic waste water and sewage sludge separating and settling device which comprises a container of essentially circular cross section over the main part of the vertical extension of the container, said container comprising a bottom wall, a lower, essentially frustoconical, upwardly diverging part extending a distance $H_1$ upwardly from said bottom wall and having a diameter $D_1$ at its lower end, and essentially cylindrical intermediate part extending a distance $H_2$ upwardly from said lower part and having a diameter $D_2$ and an upper, essentially frusto-conical, upwardly diverging part extending a distance $H_3$ upwardly from said intermediate part and having a diameter $D_3$ at its upper end, the ratios of the distances $H_1$, $H_2$ and $H_3$ being $H_1 : H_2 : H_3 = 1$ to $2 : 0.5$ to $1.5 : 1$ to 2, and the ratios of the diameters $D_1$, $D_2$ and $D_3$ being $D_1 : D_2 : D_3 = 0.3$ to $0.8 : 1 : 1.2$ to 1.5, the upper end of the container being provided with a spillover overflow extending around the major part of its periphery, and the device also comprising means defining a vertically directed liquid inlet opening arranged essentially in the middle of a horizontal cross section through the device and at a vertical distance $H_4$ from said bottom wall which is from $\frac{1}{8}$ to $\angle$ of the sum of the distances $H_1$, $H_2$ and $H_3$, said inlet opening directing the flow of water towards the bottom of the device, a cover which encloses the upper end of said container and an annular weir extending from above the overflow level to below said level, the vertical projection of said weir falling within the limits of the vertical projection of the upper conical part of the container.

2. A device according to claim 1, in which the spillover overflow extends around at least 80% of the upper edge of the container.

3. A device according to claim 2, in which the cover which encloses the upper end of the container comprises a central section and an outer essentially annular section, both of which extend above the liquid level of the overflow, and an intermediate section which extends below the overflow level and forms the annular weir.

4. A device according to claim 1, in which the slope angles of the conical upper and lower sections are within the range from 50° to 80°.

5. A device according to claim 4, in which the slope angles are within the range from 60° to 72°.

6. A device according to claim 1, which consists of a material selected from the group consisting of polyethylene and polypropylene.

7. A device according to claim 1, which consists of plastics.

8. A device according to claim 1, in which the ratio of the diameter $D_4$ of the liquid inlet opening to the diameter $D_2$ of the intermediate part is from $0.1 : 1$ to $0.3 : 1$.

9. A device according to claim 1, in which the liquid inlet opening is arranged within the intermediate essentially cylindrical part of the container.

10. A device according to claim 8, in which the means defining the liquid inlet opening comprise a tube which extends vertically through the cover and into the container.

11. A device according to claim 1, which is connected to a domestic waste water system.

12. A device according to claim 1, with a total distance $H_1 + H_2 + H_3$ of about 1 meter, a diameter $D_3$ of from about 1 to about 1.25 meters.

13. A sludge separating and settling device which comprises a container of essentially circular cross section over the main part of the vertical extension of the container, said container comprising a bottom wall, a lower, essentially frusto-conical, upwardly diverging part extending a distance $H_1$ upwardly from said bottom wall and having a diameter $D_1$ at its lower end, an essentially cylincrical intermediate part extending a distance $H_2$ upwardly from said lower part and having a diameter $D_2$ and an upper, essentially frusto-conical, upwardly diverging part extending a distance $H_3$ upwardly from said intermediate part and having a diameter $D_3$ at its upper end, the ratios of the distances $H_1$, $H_2$ and $H_3$ being $H_1:H_2:H_3 = 1$ to $2:0.5$ to $1.5:1$ to 2, the ratios of the diameters $D_1$, $D_2$ and $D_3$ being $D_1:D_2:D_3 = 0.3$ to $0.8:1:1.2$ to 1.5, the slope angle of the wall of at least one of said lower and upper conical parts amounting to from 50° to 80°, the upper end of the container being provided with a spillover overflow extending around the major part of its periphery, said device being formed to accommodate means defining a vertically directed liquid inlet opening arranged essentially in the middle of a horizontal cross section through the device and at a vertical distance $H_4$ from said bottom wall which is from $\frac{1}{8}$ to $\frac{3}{8}$ of the sum of the distances $H_1$, $H_2$ and $H_3$, and the device also comprising a cover which encloses the upper end of said container and an annular weir extending from above the overflow level to below said level, the vertical projection of said weir falling within the limits of the vertical projection of the upper conical part of the container.

14. A method of purifying a flow of domestic waste water, comprising passing said flow into a chamber of essentially circular horizontal cross section over the main part of the vertical extension of the chamber, said chamber being bounded by a bottom wall, a lower, essentially frusto-conical, upwardly diverging part extending a distance $H_1$ upwardly from said bottom wall and having a diameter $D_1$ at its lower end, an essentially cylindrical intermediate part extending a distance $H_2$ upwardly from said lower part and having a diameter $D_2$ and an upper, esentially frusto-conical, upwardly diverging part extending a distance $H_3$ upwardly from said intermediate part and having a diameter $D_3$ at its upper end, the ratios of the distances $H_1$, $H_2$ and $H_3$ being $H_1:H_2:H_3 = 1$ to 2; 0.5 to 1.5:1 to 2, the ratios of the diameter $D_1$, $D_2$ and $D_3$ being $D_1:D_2:D_3 = 0.3$ to $0.8:1:1.2$ to 1.5, the slope angle of the wall of at least one of said lower and upper conical parts amounting to from 50° to 80°, said flow being passed vertically downwards into said chamber through a liquid inlet opening arranged essentially in the middle of a horizontal cross section of the chamber at a vertical distance $H_4$ from the bottom wall of the chamber where $H_4$ is from $\frac{1}{8}$ to $\frac{3}{8}$ of the sum of the distances $H_1$, $H_2$ and $H_3$, and further comprising allowing liquid to leave the chamber by way only of the upper end of the upper part of the chamber, and causing liquid in the central region of the horizontal cross section of the chamber at the level of the upper end of the upper part of the chamber to flow downwardly, beneath an annular weir which projects downwards into the chamber to a height between $H_1 + H_2$ and $H_1 + H_2 + H_3$ from the bottom wall of the chamber, in order to leave the chamber.

* * * * *